Patented Feb. 23, 1932

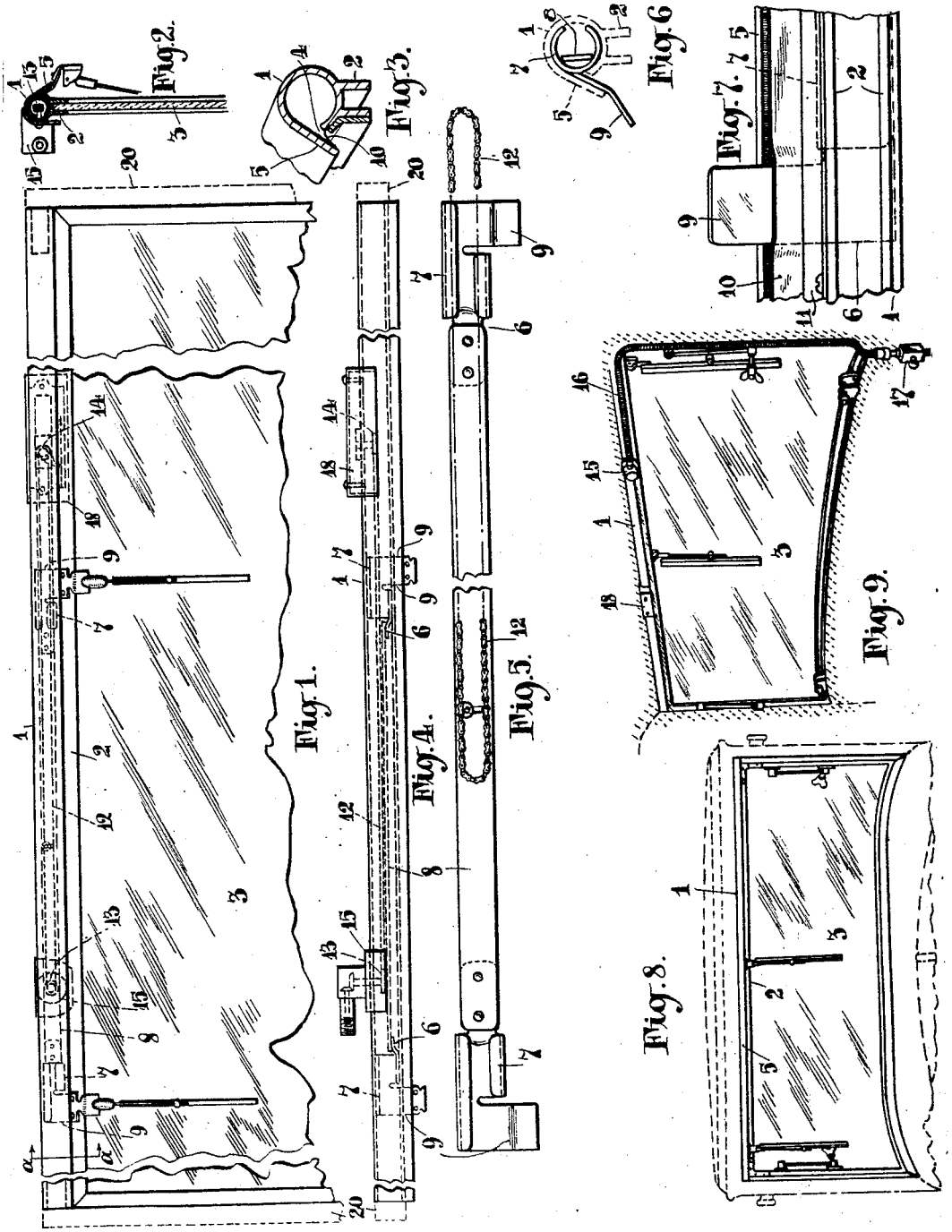

1,846,588

UNITED STATES PATENT OFFICE

WALTER DUDLEY, OF REDDITCH, ENGLAND

WINDSCREEN WIPER

Application filed December 26, 1929, Serial No. 416,708, and in Great Britain July 18, 1929.

This invention comprises certain improvements in or relating to windscreen wipers of the type in which the wiper arm is adapted to reciprocate lengthwise across the screen. This invention has for its object to combine the windscreen wiper with the frame of the windscreen, to thereby obviate the unsightly appearance of a separately constructed windscreen wiper.

As ordinarily constructed the top member of the windscreen frame comprises a horizontal tube, the ends of which are mounted on trunnion pins to provide for the pivoting of the screen.

According to the present improvements, this top tube is arranged to form the guide for a slide or slides on which the wiper arm or wiper arms is or are mounted. The top tube is provided with a longitudinal opening to provide for the connection between the wiper and the slide.

Referring to the drawings:—

Figure 1 is a front view of a combined windscreen and windscreen wiper constructed according to this invention.

Figure 2 is a section on line a—a Figure 1.

Figure 3 is a sectional view of the top bar of the windscreen.

Figure 4 is a plan view of Figure 1.

Figure 5 is a side view, drawn to an enlarged scale, of the slide carrying the wiper arms.

Figure 6 is an end view of the slide shown by Figure 5.

Figure 7 is an underside view of the top bar of the windscreen.

Figure 8 is an external view of the windscreen fitted to a car, and

Figure 9 is an inside view of the windscreen fitted to a car.

According to one form of the invention the top tube 1 of the windscreen is cylindrical around the main portion of its periphery, and on the underside a U-shaped channel 2 is formed for receiving the glass or transparent sheet 3. A longitudinal opening 4 is formed in the lower front side of the tube. The shape of the tube from the lower edge of the opening is cylindrical and the cylindrical surface continues round the tube until it passes round to the front side when it continues in a tangential direction to form a flange 5 projecting forwardly and downwardly beyond the opening in the tube. The slide 6 is mounted in the hollow top bar 1 and comprises two tubular bent ends 7 which are connected by the transverse strip 8, the transverse strip being inset to lie in a plane near the axis of the tubular portions 7. A projection 9 is provided on each tubular portion, such projection passing through the opening 4 and having a wiper fixed thereto. The distance between the projections 9 is substantially one-half the width of the screen or the required portion of the screen to be wiped, so that the slide travels only over one-half the width of the screen to be cleaned. The pressure re-action of the wiper arm causes the projections 9 to bear against the flange 5 of the tube 1. The opening 4 is closed by means of a thin strip of metal 10 which is fixed to the tube 1 by means of the fixing strip 11. This strip of metal 10, by its elasticity, bears against the flange 5, and in view of the small thickness of the projections or tongues 9 the strip 10 bears entirely along its full length against the flange 5 except for a very small distance on each side of the projections 9. The flange 5 is arranged on the outside of the screen, and water and dirt are prevented from entering the slot 4.

The slide is continuously reciprocated backwards and forwards by means of the continuous chain 12 which passes over the sprockets 13 and 14. The sprocket 13 is journalled in the fitting 15 secured to the tube 1 on the inner side, and a flexible shaft 16 is connected thereto, the flexible shaft being carried along the top and down the side of the screen to a switch 17 for connecting or disconnecting the drive to this flexible shaft. The sprocket 14 is carried by the fitting 18 fixed to the front of the tube 1, such fitting 18 being provided with a tensioning device. As two wiper arms are provided the length of the chain is comparatively short and thereby obviates the liability of the chain becoming disconnected or jammed which is very liable to happen if the chain runs along the complete length of the screen. The hollow tube 1 is pivotally mounted in trunnions on the side fittings 20.

By this combination of the windscreen and wiper, the cost of production is considerably reduced, whilst an extremely neat appearance is obtained. Whilst the wipers are located on the outside the connection to the source of power for the driving mechanism is on the inside. The connecting strip 8 forms a support for the chain 12 as the chain runs over the face of the strip 8.

I claim:

1. In a combined windscreen wiper and windscreen frame, a cylindrical hollow bar having a slot in the lower side located to one side of the centre, and having open cylindrical ends, said hollow bar forming the top frame bar for the windscreen and the pivot sockets for trunnion pins on which the frame is pivotally mounted and also the guide bar for a cylindrical slide carrying the wiper arm, two flanges on the underside of the bar between which the transparent screen is fixed, a flange on the hollow bar formed by continuing the wall of the hollow cylindrical bar tangentially in a downward and forward direction beyond the slot, a thin metal sealing strip fixed to one of the said flanges on the underside of the hollow bar and bent to press at an angle against said flange formed by continuing the wall of the hollow bar, a fixing strip fixing the sealing strip to said flange, and a slide carrying the wiper arm mounted in the hollow bar and having a thin metal tongue passing between the sealing strip and the flange on which it bears, said tongue passing in a downwardly inclined direction to provide for the attachment of the wiper arm at a distance from the screen.

2. In a combined windscreen wiper and windscreen frame, a cylindrical hollow bar having a slot in one side, and having open cylindrical ends, said hollow bar forming the top frame bar for the windscreen and the pivot sockets for trunnion pins on which the frame is pivotally mounted and also the guide bar for a slide carrying the wiper arm, two flanges on the underside of the bar between which the transparent screen is fixed, a flange on the hollow bar formed by continuing the wall of the hollow cylindrical bar tangentially in a downward and forward direction beyond the slot, a thin metal sealing strip fixed to one of the said flanges on the underside of the hollow bar and bent to press at an angle against said flange formed by continuing the wall of the hollow bar, a fixing strip fixing the sealing strip to said flange, and a slide mounted to reciprocate in the hollow bar comprising two round tubular ends connected by a metal strip and a thin metal tongue projecting from each tubular end in a downwardly inclined direction to provide for the attachment of the wiper at a distance from the screen.

In witness whereof I have signed this specification at Birmingham, England.

WALTER DUDLEY.